(12) United States Patent
Stinson et al.

(10) Patent No.: US 10,144,345 B2
(45) Date of Patent: Dec. 4, 2018

(54) ILLUMINATED RUNNING BOARD

(71) Applicant: Ford Global Technologies, LLC, Dearborn, MI (US)

(72) Inventors: Scott Stinson, Livonia, MI (US); Mark Beilman, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 100 days.

(21) Appl. No.: 15/360,229

(22) Filed: Nov. 23, 2016

(65) Prior Publication Data
US 2018/0141486 A1 May 24, 2018

(51) Int. Cl.
| | |
|---|---|
| *B60L 1/14* | (2006.01) |
| *B60Q 1/32* | (2006.01) |
| *B60R 3/02* | (2006.01) |
| *F21S 41/19* | (2018.01) |
| *H02J 50/10* | (2016.01) |
| *B60R 3/00* | (2006.01) |
| *F21S 9/02* | (2006.01) |
| *F21V 23/06* | (2006.01) |
| *H02J 7/02* | (2016.01) |
| *H05B 37/02* | (2006.01) |
| *H02J 7/34* | (2006.01) |

(52) U.S. Cl.
CPC .............. *B60Q 1/323* (2013.01); *B60L 1/14* (2013.01); *B60R 3/002* (2013.01); *B60R 3/02* (2013.01); *F21S 9/02* (2013.01); *F21S 41/19* (2018.01); *F21V 23/06* (2013.01); *H02J 7/025* (2013.01); *H02J 50/10* (2016.02); *H05B 37/0227* (2013.01); *B60Q 2400/40* (2013.01); *B60Q 2900/30* (2013.01); *H02J 7/345* (2013.01)

(58) Field of Classification Search
CPC .... B60L 1/14; B60Q 1/26; B60Q 1/32; B60Q 1/323; B60Q 2400/40; B60Q 2900/30; B60R 3/002; B60R 3/02; H02J 7/025; H02J 7/345; H02J 50/10; F21S 41/00; F21S 41/02; F21S 41/19; F21S 43/00; F21S 43/10; F21S 43/19; F21V 23/06
USPC ........................................................ 307/10.8
See application file for complete search history.

(56) References Cited

U.S. PATENT DOCUMENTS

| | | | |
|---|---|---|---|
| 5,323,099 A | 6/1994 | Bruni et al. | |
| 6,392,559 B1* | 5/2002 | Sharpe, Jr. ............. | B60Q 1/323 340/12.22 |
| 7,017,927 B2* | 3/2006 | Henderson .............. | B60R 3/002 280/163 |
| 7,318,596 B2 | 1/2008 | Scheuring, III et al. | |

(Continued)

FOREIGN PATENT DOCUMENTS

| | | |
|---|---|---|
| CN | 204641564 | 9/2015 |
| KR | 101199204 | 11/2012 |

(Continued)

*Primary Examiner* — Levi Gannon
(74) *Attorney, Agent, or Firm* — Jason Rogers; Price Heneveld LLP

(57) ABSTRACT

A vehicle includes a running board operable between deployed and undeployed positions. The running board includes a light source. An energy storage device is electrically coupled to the light source. An inductive receiving coil is electrically coupled to the energy storage device. A transmitting coil is positioned proximate an exterior surface of the vehicle. The transmitting coil is configured to transmit a magnetic field to the receiver coil.

16 Claims, 4 Drawing Sheets

(56) References Cited

U.S. PATENT DOCUMENTS

| | | | |
|---|---|---|---|
| 9,205,781 B1* | 12/2015 | May | B60R 3/02 |
| 9,333,919 B2 | 5/2016 | Crandall et al. | |
| 2008/0100023 A1* | 5/2008 | Ross | B60R 3/002 |
| | | | 280/166 |
| 2009/0026959 A1* | 1/2009 | Lin | B60Q 7/00 |
| | | | 315/77 |
| 2010/0194070 A1* | 8/2010 | Stauffer | B60R 3/002 |
| | | | 280/166 |
| 2013/0201714 A1* | 8/2013 | Huang-Tsai | B60Q 1/323 |
| | | | 362/545 |
| 2013/0214591 A1* | 8/2013 | Miller | H02J 5/005 |
| | | | 307/9.1 |
| 2015/0251584 A1* | 9/2015 | Deyaf | H04B 5/0037 |
| | | | 307/10.8 |

FOREIGN PATENT DOCUMENTS

| | | | |
|---|---|---|---|
| TW | 201531415 | 8/2015 | |
| WO | WO 02/053416 A2 * | 7/2002 | B60Q 1/323 |

\* cited by examiner

ILLUMINATED RUNNING BOARD

FIELD OF THE INVENTION

The present disclosure generally relates to vehicle running boards, and more particularly, to vehicles with illuminated running boards.

BACKGROUND OF THE INVENTION

Motor vehicles such as trucks and SUVs typically include running boards may offer a variety of utility and aesthetic benefits. Providing running boards with light illumination in such vehicles may be advantageous.

SUMMARY OF THE INVENTION

According to one aspect of the present disclosure, a vehicle includes a running board operable between deployed and undeployed positions. The running board includes a light source. An energy storage device is electrically coupled to the light source. An inductive receiving coil is electrically coupled to the energy storage device. A transmitting coil is positioned proximate an exterior surface of the vehicle. The transmitting coil is configured to transmit a magnetic field to the receiver coil.

According to another aspect of the present disclosure, a vehicle includes a running board operable between deployed and undeployed positions. The running board includes a light source. An energy storage device is electrically coupled to the light source. A wireless charging system includes a transmitter coil and a receiver coil. The receiver coil is electrically coupled to the energy storage device.

According to yet another aspect of the present disclosure, a vehicle includes a running board. A light source is positioned on the running board. A wireless charging system is configured to power the light source.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION OF THE PREFERRED EMBODIMENTS

Additional features and advantages of the invention will be set forth in the detailed description which follows and will be apparent to those skilled in the art from the description or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1:
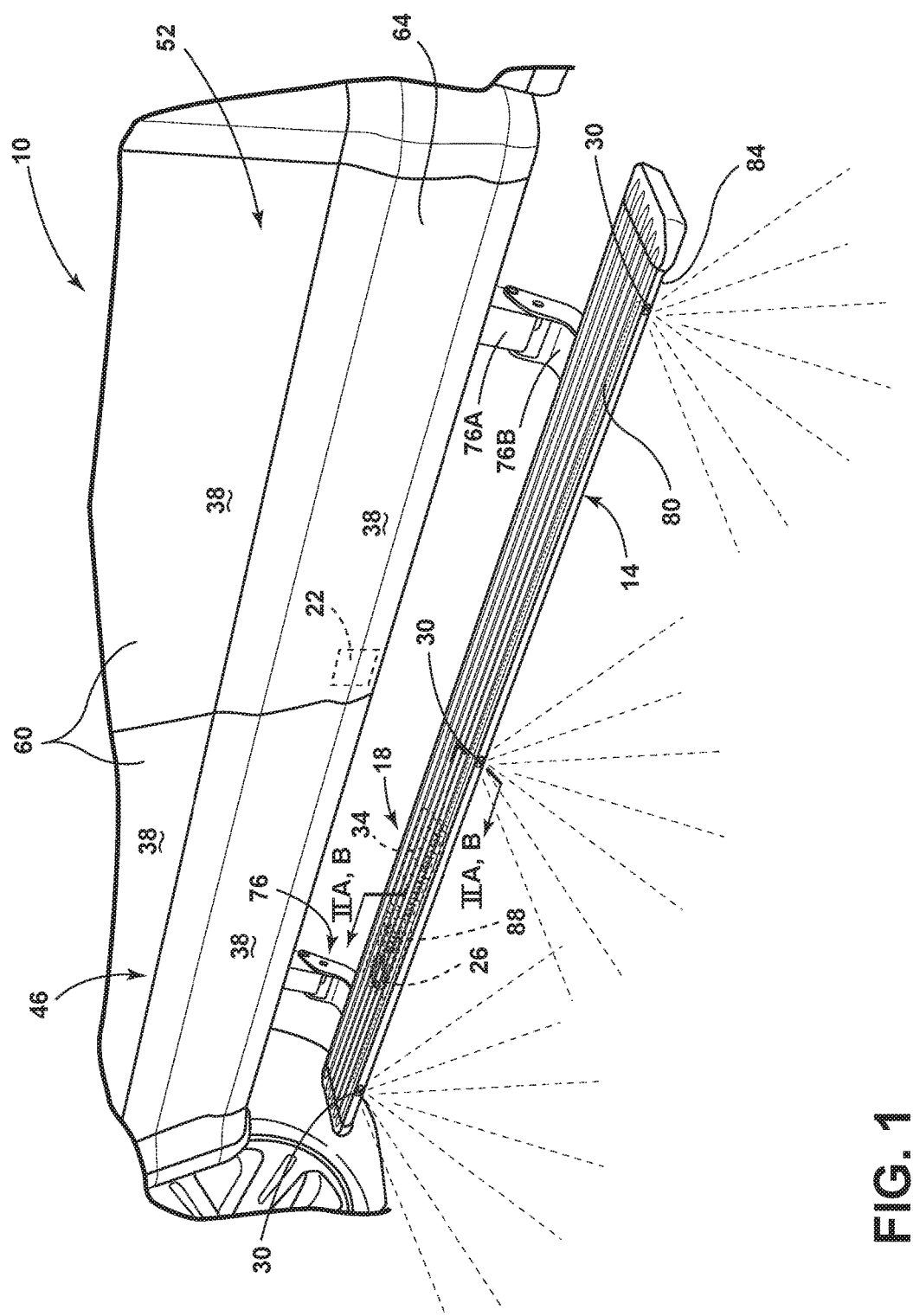
FIG. 1 is a side perspective view of a vehicle incorporating a wirelessly charged illuminated running board, according to one embodiment.
Figure 2A:
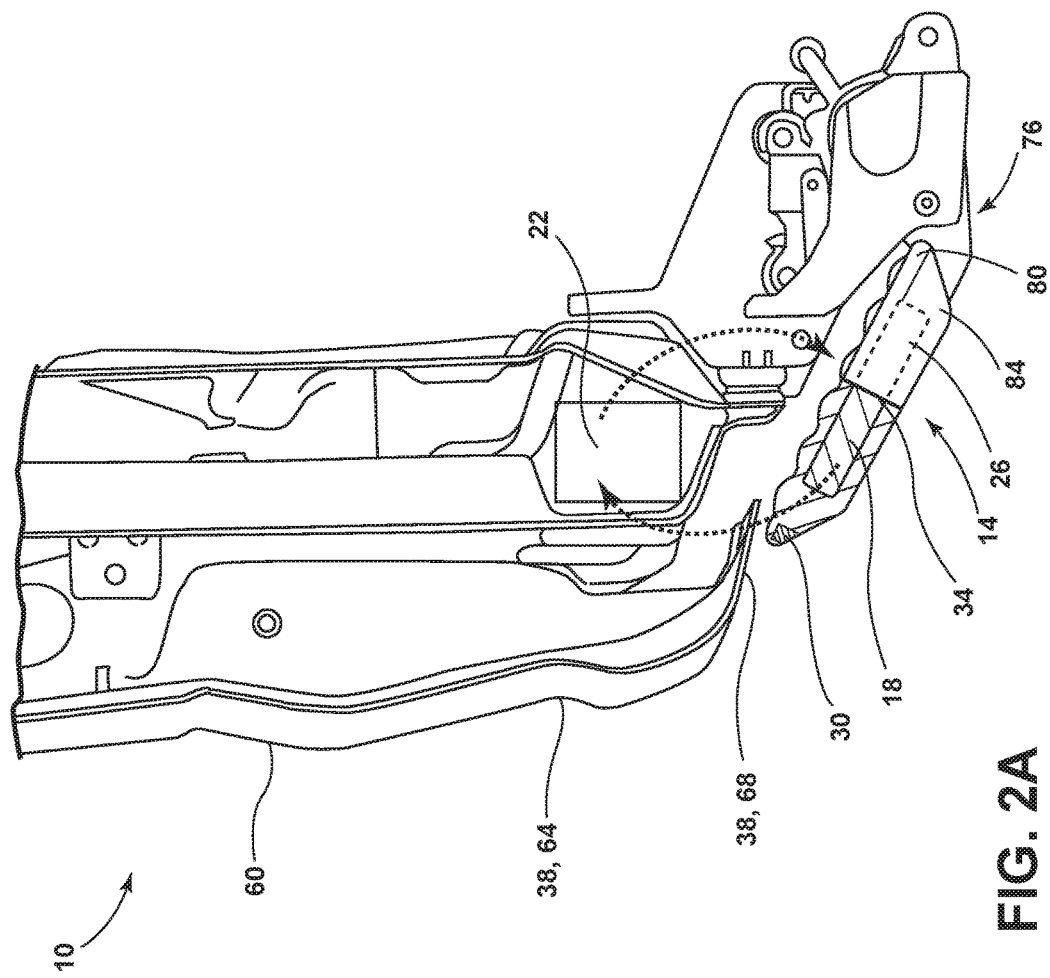
FIG. 2A is a cross-sectional view taken through line II-II of FIG. 1 showing the running board in an undeployed position.
Figure 2B:
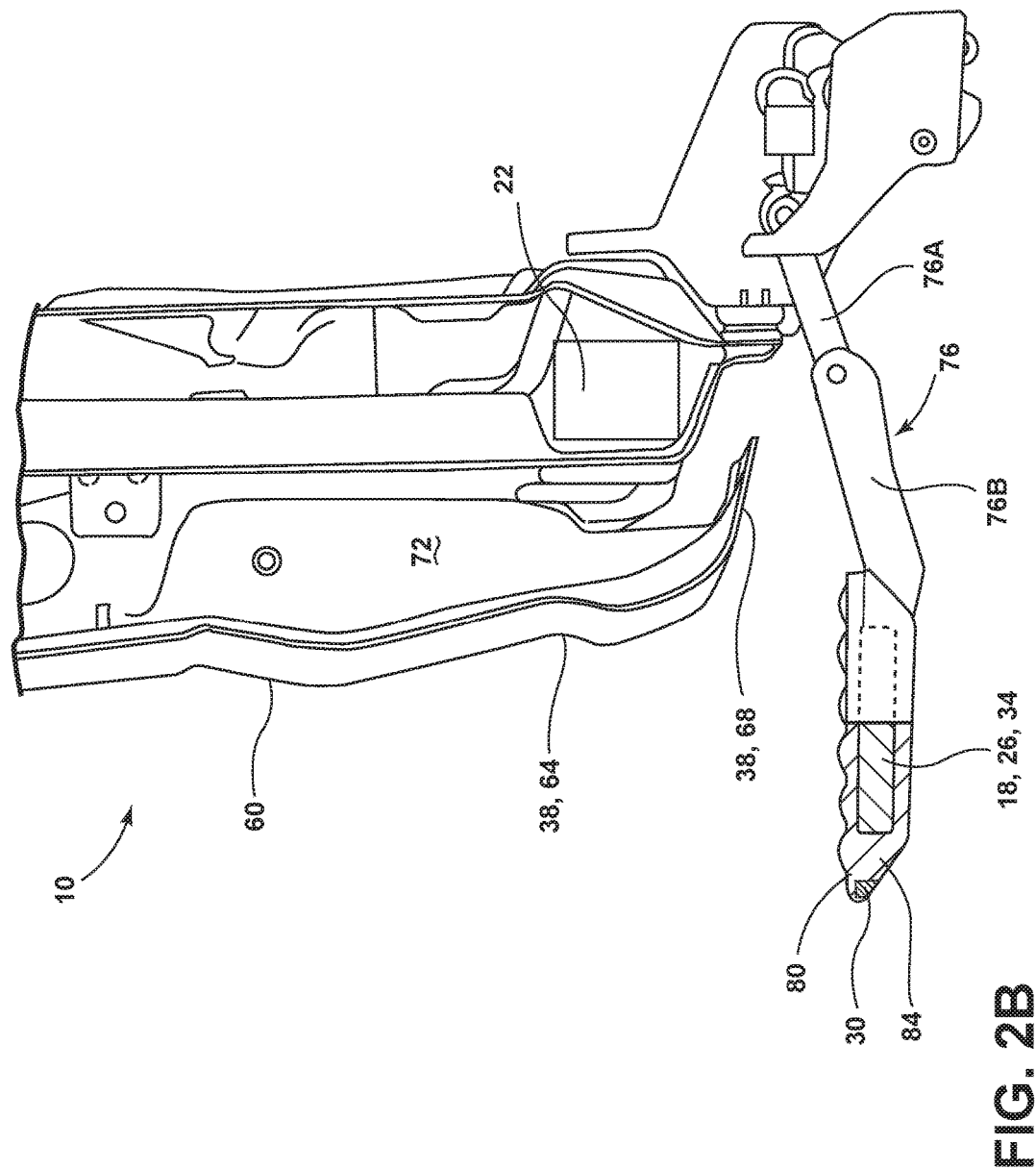
FIG. 2B is a cross-sectional view taken through line II-II of FIG. 1 showing the running board in a deployed position.
Figure 3:
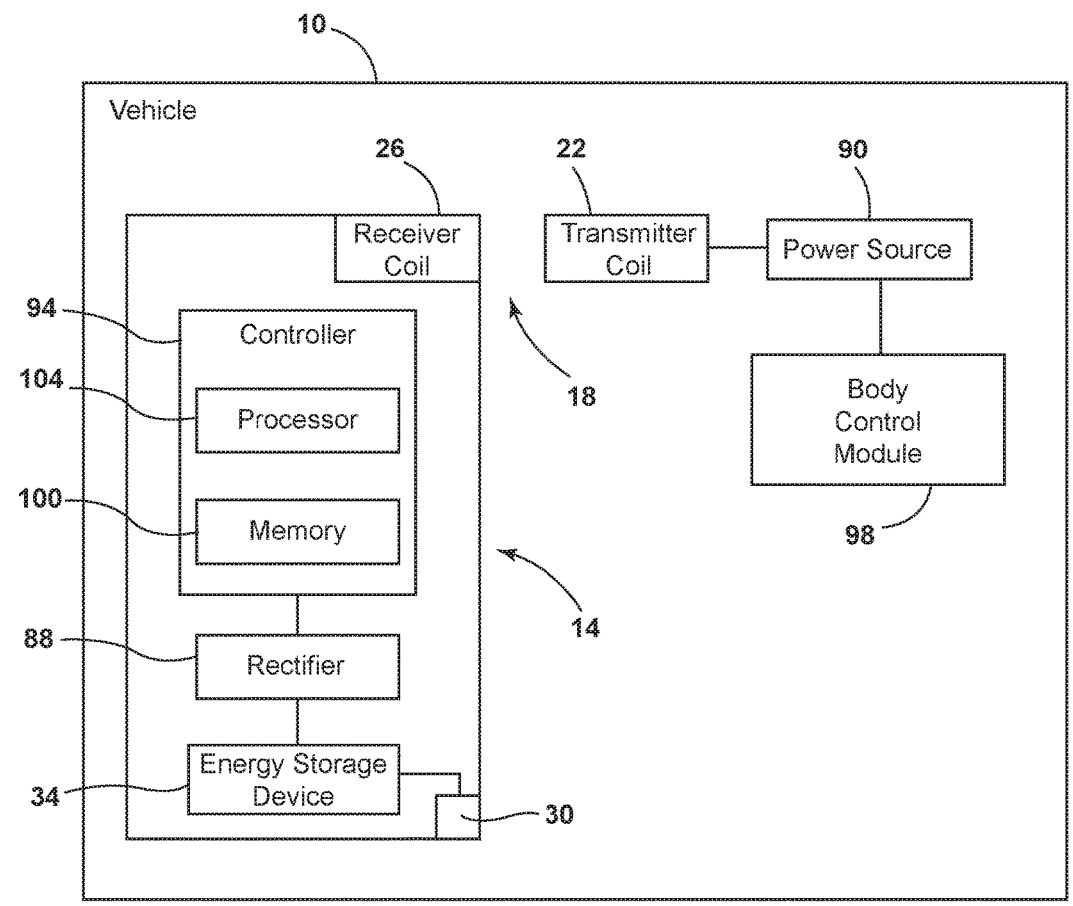
FIG. 3 is a box diagram of the vehicle, according to one example.

Referring now to FIGS. 1-3, depicted is a wheeled motor vehicle 10 including a running board 14 extending along a lower side of the vehicle body adjacent to the passenger doors to provide a step for easy access to the vehicle 10. In the embodiment shown, the running board 14 is shown as a powered running board operable between deployed (FIGS. 1 and 2B) and undeployed (FIG. 2A) positions. The vehicle 10 includes an inductive charging system 18 (i.e., a wireless power supply or charging system) including a transmitter coil assembly 22 located in the vehicle body and a receiver coil assembly 26 located on the running board 14. The running board 14 also includes one or more light sources 30 and an energy storage device 34 electrically coupled to the light source 18. The transmitter coil assembly 22 is positioned proximate an exterior surface 38 of the vehicle 10. The transmitter coil assembly 22 is configured to transmit a magnetic field to the receiver coil assembly 26.

The vehicle 10 may be any type of vehicle 10 such as a sport utility vehicle, a van, a pick-up truck, car or other vehicle 10 incorporating the running board 14. In the depicted example, the running board 14 is positioned along a side of the vehicle 10, but it will be understood that the running board 14 may additionally or alternatively be positioned at a front and/or a rear of the vehicle 10. In the depicted side configuration of the running board 14, the running board 14 extends below and proximate a front door 46 and a rear door 52 of the vehicle 10. In alternate examples, the running board 14 may extend proximate only one door (e.g., either the front door 46 or the rear door 52) or may be composed of multiple separate smaller portions (i.e., separate running boards 14 under each door 46, 52). In examples where the running board 14 is composed of multiple portions, each of the portions may be operable between the deployed and undeployed positions independently. In the undeployed position, the running board 14 is stowed against and/or underneath a body 56 of the vehicle 10. In the undeployed position, the running board 14 is positioned proximate one or more of the exterior surfaces 38 of the vehicle 10. The exterior surface 38 of the vehicle 10 may be part of a door panel 60, a rocker panel 64, a flange 68, an interior panel 72, or part of a running board linkage 76.

The running board 14 is coupled to the vehicle 10 via the linkage 76. The linkage 76 includes a first link 76A and a second link 76B. The first link 76A is coupled to the vehicle 10 and the second link 76B is coupled to the running board 14. The first link 76A and the second link 76B are rotatably, or pivotally, coupled to one another to allow the running board 14 to move between the undeployed and deployed positions. The running board 14 includes a step surface 80 and a base portion 84. The base portion 84 is coupled to the second link 76B. Positioned within the running board 14 is the receiver coil assembly 26 of the inductive charging system 18, the one or more light sources 30 and the energy storage device 34. An optional rectifier 88 may be coupled between the receiver coil assembly 26 and the energy storage device 34 to convert the electrical power from AC to DC.

Each of the transmitter and receiver coil assemblies 22, 26 includes one or more coils. The coils may include a copper winding coil arranged with a ferrite pad. The coils may form a continuous ring-like shape defining a coil opening. For example, the coils may form a circular shape, or may have straight sides forming a quadrilateral shape. The coils may be formed from copper wire, metallic materials, or other conductive materials capable of forming the coil to transmit or receive electrical power. The transmitter coil assembly 22 may be electrically coupled with a power source 90, as explained in greater detail below. In the undeployed position, the power source 90 may supply power to the transmitter coil assembly 22 to produce a magnetic field. In other words, the transmitter coil assembly 22 is configured to transmit the magnetic field when the running board 14 is in the undeployed position. According to various embodiments, the transmitting coil assembly 22 is configured to not transmit the magnetic field when the running board 14 is in the deployed position. The transmitter coil assembly 22 is positioned proximate one or more of the exterior surfaces 38 such that when the running board 14 is in the undeployed position, the receiver coil assembly 26 is within the range of the magnetic field produced by the transmitter coil assembly 22.

The receiver coil assembly 26 is positioned within the running board 14 such that when the running board 14 is in the undeployed position, the receiver coil assembly 26 is positioned proximate the transmitter coil assembly 22. The receiver coil assembly 26 is configured to receive the magnetic field generated by the transmitter coil assembly 22 so as to transfer electrical energy. Such reception of the magnetic field by the receiving coil assembly 26 generates electrical current. The rectifier 88 is electrically coupled between the receiver coil assembly 26 and the energy storage device 34. The rectifier 88 may be an electrical device that converts an alternating current (AC) (e.g., from the receiver coil assembly 26) into a direct current (DC) by allowing a current to flow through it in one direction only. Electrically coupled to the rectifier 88 and/or the receiver coil assembly 26 is the energy storage device 34. According to various examples, the energy storage device 34 is configured to store electrical energy generated at the receiver coil assembly 26. The energy storage device 34 may be a rechargeable battery (e.g., lithium ion, lithium polymer, nickel cadmium, nickel-metal hydride, lead acid, etc.), a capacitor, a fuel cell, or other energy storage device which may store and release electrical power for the running board 14 to power the one or more light sources. One or more electromagnetic shields may be positioned within and/or around the running board 14 and/or body 56 to shield various electrical components (e.g., the energy storage device 34) from the magnetic field produced by the transmitter coil 22.

The energy storage device 34 is configured to provide electrical energy to the one or more light sources 30. According to various examples, the running board 14 may include a plurality (e.g., two or more) light sources 30. As explained in greater detail below, the light sources 30 may be activated in a variety of lighting patterns as controlled by a controller 94 (FIG. 3). The light sources 30 may be light-emitting diodes (LED), incandescent bulbs, printed light sources and/or combinations thereof. In the depicted embodiment, the light sources 30 are discrete light sources, but in other embodiments the light sources 30 may be incorporated into light-producing assemblies extending over a portion or the entire length of the running board 14. The energy storage device 34 may be configured to power the light sources 30 for greater than about 1 second, 1 minute, 1 hour or 1 day. Storage of the electrical energy produced by the receiver coil assembly 26 within the energy storage device 34 may be advantageous in allowing the running board 14 to illuminate for a period of time in the deployed position while the receiver coil assembly 26 is not receiving the magnetic field.

According to various examples, the running board 14 and/or the body 56 of the vehicle 10 may include one or more proximity sensors. The proximity sensors may utilize lidar, sonar, radar, other distance detection sensors, and combinations thereof. The proximity sensors may be configured to detect and transmit a distance between the running board 14 and the body 56. The distance sensed between the running board 14 and the body 56 of the vehicle 10 may be used to determine when the transmitter coil assembly 22 should and should not emit a wireless signal receivable by the receiver coil assembly 26. For example, when the distance sensed between the running board 14 and the body 56 falls below a predefined threshold, the transmitter coil assembly 22 may be activated and when the distance exceeds the predetermined threshold, the transmitter coil assembly 22 may be deactivated.

Referring now to FIG. 3, depicted is a block diagram of the vehicle 10 in which the running board 14 may be implemented. The vehicle 10 may include a body control module 98 which is in electrical communication with the onboard power source 90 and the transmitter coil assembly 22. The body control module 98 may be configured to control the power source 90 to provide electrical energy to the transmitter coil assembly 22 when the running board 14 is in the undeployed position (i.e., when the receiver coil assembly 26 of the running board 14 is proximate the transmitter coil assembly 22). The controller 94 is in communication with the inductive charging system 18 and the energy storage device 34. According to various embodiments, the controller 94 may be part of the receiver coil assembly 26. According to other examples, the controller 94 may be positioned on the vehicle 10. The controller 94 may include a memory 100 having instructions contained therein that are executed by a processor 104 of the controller 94. The controller 94 may regulate electrical energy generated by the receiver coil assembly 26 in conjunction with the rectifier 88. Stored within the memory 100 may be one or more light control routines for activating the light sources 30. The light control routines may be configured to activate the light sources 30 in "welcome" and "farewell" programs which are configured to greet and send off, respectively, a user of the vehicle 10 (e.g., based on key fob movement or recorded occupancy of the vehicle 10). Further, the memory 100 may contain a variety of light control routines configured to indicate a status or information about the running board 14. For example, one light control routine may be used to indicate a status of the charge of the energy storage device 34 (e.g., change colors from green to red, blink, vary intensity of the light output) based on a charge of the energy storage device 34. In another example, the light control routine may be configured to indicate an issue with the running board 14 and/or inductive charging system 18 (e.g., the energy storage device 34 is not holding a charge, no magnetic field is being transmitted or received, the magnetic field is improper, etc.). Further, the memory 100 may include a light control routine for allowing the light sources 30 to actively communicate information to drivers of other vehicles. For example, the light control routine may activate the light sources 30 to function as running lamps, turn indicators, brake indicators, or other informative lighting sequences. According to other various examples, the light sources 30 may be configured to provide puddle lighting on a surface below the vehicle 10. Additionally or alternatively, the memory 100 may include one or more charging routines. For example, the memory 100 may include a charging routine configured to activate the body control module 98 to provide power from the power source 90 to the transmitter coil assembly 22 if a sensed charge of the energy storage device 34 is below a predetermined threshold. For example, if the energy storage device 34 is below or about 50%, 40%, 30%, 20%, 10% or below or about 1%, the charging routine may be configured to activate the transmitter coil assembly 22. In another example, the memory 100 may include one or more routines for powering the light sources 30 while the running board 14 is in the undeployed position. For example, the transmitter coil 22 may provide the magnetic field to the receiver coil 26 to continuously power the light sources 30, without the use of the energy storage device 34.

According to various examples, the controller 94 of the running board 14 may wirelessly communicate (e.g., wireless coupling) with the body control module 98 and/or one or more sensors located on the vehicle 10. In such an example, wireless coupling of the of the controller 94 with vehicle sensors may allow the controller 94 to determine to not deploy the running board 14, but to still activate the light control routine. In a specific example, a vehicle sensor may indicate object proximate the deployed position of the running board 14 and the controller 94 and/or body control module 98 may choose not to deploy the running board 14, but still activate the light control routine (e.g., as a puddle lamp illuminating the object).

Use of the present disclosure may offer a variety of advantages. First, use of the inductive charging system 18 in conjunction with the running board 14 may allow for the removal of wires and electrical connections which span the linkage 80. Conventional powered and/or illuminated running boards 14 may require electrical connections spanning linkages which may not be aesthetically pleasing and may be damaged during operation of the vehicle 10 (e.g., during deployment and/or retraction of the running board 14, while driving etc.). Second, use of the inductive charging system 18 allows for the minimization of parts which may reduce manufacturing time and cost. Third, use of the energy storage device 34 allows for the running board 14 to be illuminated by the light sources 30 for a sustained period of time in the deployed position.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims as set forth below, are incorporated into and constitute part of this Detailed Description.

What is claimed is:

1. A vehicle comprising:
   a running board operable between deployed and undeployed positions, the running board comprising:
      a light source;
      an energy storage device electrically coupled to the light source; and
      an inductive receiving coil electrically coupled to the energy storage device; and
   a transmitting coil positioned proximate an exterior surface of the vehicle, wherein the transmitting coil is configured to transmit a magnetic field to the receiver coil, wherein the transmitting coil is configured to transmit the magnetic field to the receiver coil when the running board is in the undeployed position and not transmit the magnetic field to the receiver coil when the running board is in the deployed position.

2. The vehicle of claim 1, wherein reception of the magnetic field by the receiving coil generates electrical energy.

3. The vehicle of claim 1, wherein the energy storage device comprises a battery.

4. The vehicle of claim 1, wherein the energy storage device comprises a capacitor.

5. The vehicle of claim 1, further comprising:
   a rectifier electrically coupled between the inductive receiving coil and the energy storage device.

6. A vehicle comprising:
   a running board operable between deployed and undeployed positions, comprising:
      a light source; and
      an energy storage device electrically coupled to the light source; and
   a wireless charging system comprising a transmitter coil, and a receiver coil electrically coupled to the energy storage device, wherein moving the running board from the deployed position to the undeployed position enables the transmitter coil to transmit a magnetic field to the receiver coil.

7. The vehicle of claim 6, wherein the transmitter coil is positioned proximate an exterior surface of the vehicle.

8. The vehicle of claim 6, wherein the receiver coil is positioned on the running board.

9. The vehicle of claim 6, wherein the energy storage device comprises a battery.

10. The vehicle of claim 6, further comprising:
    a rectifier electrically coupled between the receiver coil and the energy storage device.

11. A vehicle comprising:
    a light source positioned on a running board; and
    a wireless charging system configured to power the light source, the wireless charging system having a transmitter coil configured to not transmit a magnetic field to a receiver coil electrically coupled with the light while the running board is in a deployed position.

12. The vehicle of claim 11, further comprising:
    an energy storage device electrically coupled with the receiver coil.

13. The vehicle of claim 12, wherein the energy storage device is a battery.

14. The vehicle of claim 13, further comprising:
    a rectifier electrically coupled between the receiver coil and the energy storage device.

15. The vehicle of claim 14, wherein the wireless charging system is an induction charging system.

16. The vehicle of claim 11, wherein the transmitter coil is configured to transmit the magnetic field to the receiver coil when the running board is in an undeployed position.

* * * * *